United States Patent
Becka

(10) Patent No.: US 6,850,172 B2
(45) Date of Patent: Feb. 1, 2005

(54) DAMAGE ALERT DEVICE

(76) Inventor: George Becka, 11178 Hempstead La., North Royalton, OH (US) 44133

( * ) Notice: Subject to any disclaimer, the term of this patent is extended or adjusted under 35 U.S.C. 154(b) by 0 days.

(21) Appl. No.: 10/321,196

(22) Filed: Dec. 17, 2002

(65) Prior Publication Data

US 2003/0201908 A1 Oct. 30, 2003

Related U.S. Application Data

(60) Provisional application No. 60/375,617, filed on Apr. 24, 2002.

(51) Int. Cl.$^7$ ................................................. B60Q 1/48
(52) U.S. Cl. .................... 340/932.2; 340/436; 340/908; 340/933; 340/691.6; 40/608; 180/274
(58) Field of Search ............................. 340/932.2, 943, 340/933, 632, 435, 436, 908, 908.1, 693.9, 944, 691.6, 692, 425.5; 194/205, 902, 217; 404/18; 40/608, 607.01; 49/25, 31; 73/23.2, 23.34; 180/199, 271, 274

(56) References Cited

U.S. PATENT DOCUMENTS

| | | |
|---|---|---|
| 3,219,972 A | 11/1965 | Williams |
| D240,209 S | 6/1976 | Mendolous |
| 3,977,354 A | 8/1976 | Mazurek |
| 4,036,165 A | 7/1977 | Wood |
| 4,101,868 A | 7/1978 | Bubnich et al. |
| 4,145,681 A | 3/1979 | Bubnich et al. |
| 4,341,488 A | 7/1982 | Ryan |
| 4,641,994 A | 2/1987 | Hankison |
| 4,813,758 A | 3/1989 | Sanders |
| 5,004,997 A | 4/1991 | Shisgal et al. |
| 5,127,357 A | 7/1992 | Viskovich |
| 5,189,802 A | 3/1993 | Bergfield |
| D336,314 S | 6/1993 | Teale |
| 5,227,785 A | 7/1993 | Gann et al. |
| 5,231,392 A | 7/1993 | Gust |
| 5,297,500 A | 3/1994 | Wilson |
| 5,442,348 A * | 8/1995 | Mushell ................... 340/932.2 |
| D363,248 S | 10/1995 | Bogacki, III |
| 5,486,810 A | 1/1996 | Schwarz |
| D373,094 S | 8/1996 | Marderosian |
| D375,273 S | 11/1996 | Wilson |
| D376,554 S | 12/1996 | Richardson et al. |
| D377,621 S | 1/1997 | Papa |
| 5,687,516 A | 11/1997 | Sheehan et al. |
| D407,338 S | 3/1999 | Kline |
| D419,096 S | 1/2000 | Copenhaver |
| 6,062,162 A | 5/2000 | Dean |
| 6,104,299 A * | 8/2000 | Brusseaux et al. .......... 340/603 |
| 6,150,957 A * | 11/2000 | Henz et al. ................. 340/908 |
| 6,154,150 A | 11/2000 | Laubach |
| 6,161,497 A | 12/2000 | Sallee |
| 6,163,253 A | 12/2000 | Yaron et al. |
| D437,245 S | 2/2001 | Hurley |
| 6,191,706 B1 | 2/2001 | Kositkun |
| 6,218,962 B1 | 4/2001 | Fiene |
| 6,229,455 B1 * | 5/2001 | Yost et al. ................... 340/943 |
| 6,243,644 B1 * | 6/2001 | Dengler ....................... 340/933 |

* cited by examiner

*Primary Examiner*—Davetta W. Goins
(74) *Attorney, Agent, or Firm*—Brouse McDowell; Roger D. Emerson; Heather M. Barnes

(57) ABSTRACT

A portable vehicle parking assistance device has a base and a vertical shaft to which is coupled a motion detecting sensor and an alerting mechanism; namely, a light or horn. The device also has a combination carbon monoxide and smoke detector, which is linked to the alerting mechanism. When the device is bumped by a vehicle during use or when the combination carbon monoxide and smoke detector detects the presence of these fumes, the alerting mechanism is actuated, thereby notifying the vehicle operator.

15 Claims, 2 Drawing Sheets

DAMAGE ALERT DEVICE

Figure 1:
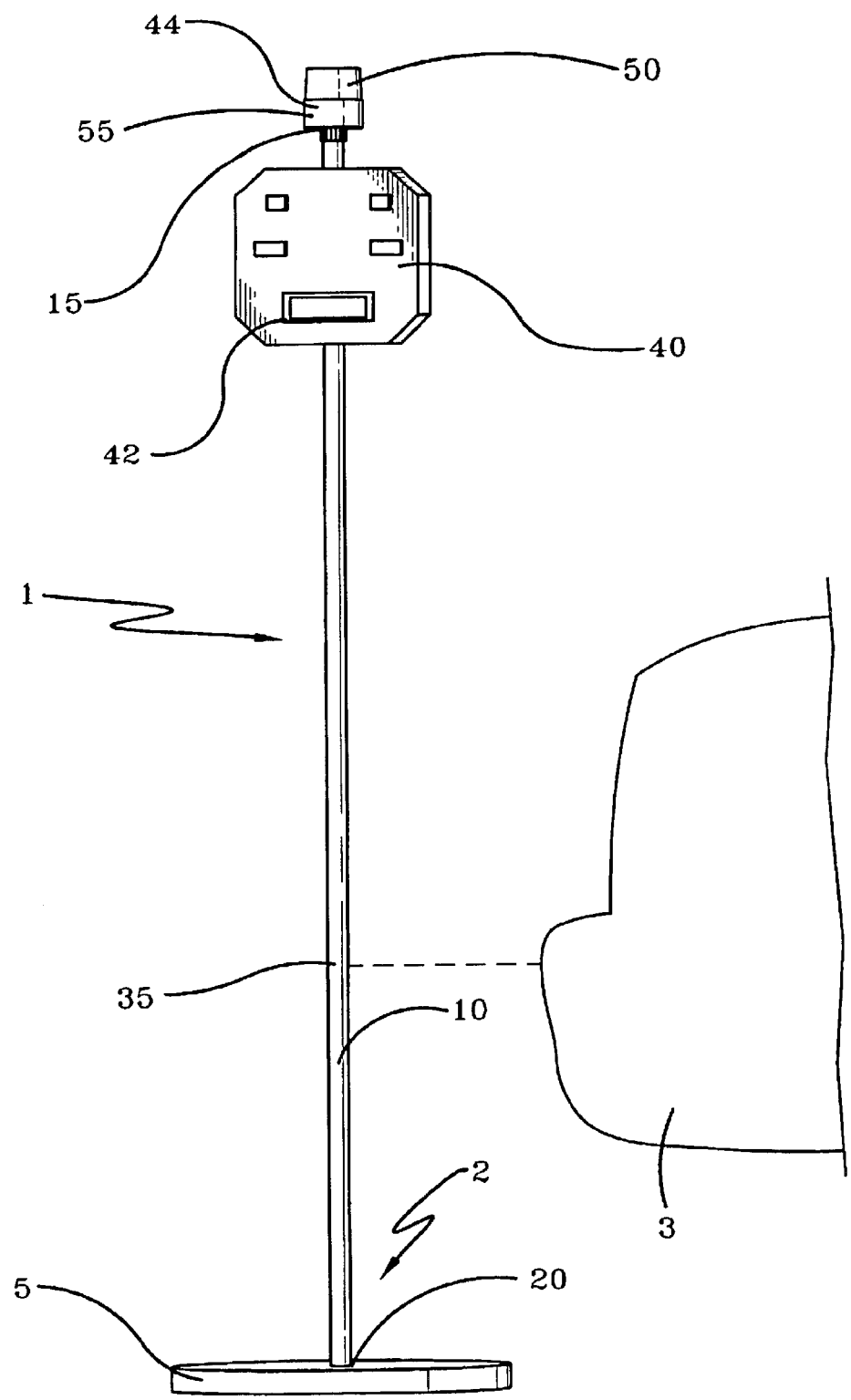

This application claims priority to U.S. Provisional Application No. 60/375,617, which was filed on Apr. 24, 2002 titled DAMAGE ALERT DEVICE.

1. BACKGROUND OF THE INVENTION

A. Field of Invention

This invention pertains to the art of alarms or signaling devices and more particularly to the art of vehicle parking assistance devices.

B. Description of the Related Art

The invention of this application is directed to a safety device that is useful in assisting associated vehicle operators in parking their vehicles in closed or confined areas where a build-up of smoke or toxic fumes emanating from an operating vehicle could prove harmful or fatal to the vehicle operator or bystanders and where undirected movement of the vehicle in the course of parking it could result in damage to the vehicle or the surrounding environment.

The use of vehicle parking assistance devices is well known in the prior art and many devices have been developed for this purpose. However, all of the known devices have drawbacks and, therefore, limited application. For instance, some of the prior art devices have complex systems and, thus, are expensive; others lack portability. Some fail to give the accurate position of the vehicle. Such devices use a variety of mechanisms including pressure switches, mirrors, motion sensors, etc.

An additional drawback to parking assistance devices known in the prior art is that they do not afford any warning of the buildup of toxic fumes like carbon monoxide that emanate from vehicles being parked in confined areas. Confined area meaning an area where there is a risk of a buildup of harmful toxic fumes due to a lack of ventilation. Confined areas may include automobile dealerships or garages where vehicles are often parked indoors for display or repair. The risk of toxic vehicle fumes is well known and results in a number of injuries to motorists and bystanders alike every year. Because many of these toxic fumes are odorless, victims of these fumes are often unaware of the danger. The danger of toxic fume poisoning increases when the vehicle is being operated in an enclosed area. Small, enclosed areas are locations where one would use a parking assistance device.

The present invention provides a new and improved portable, parking assistance device and combination carbon monoxide/smoke detector system, and overcomes certain difficulties inherent in the related inventions while providing better overall results.

II. SUMMARY OF THE INVENTION

One object of the present invention is to provide a vehicle parking assistance device with a combination carbon monoxide/smoke detector. The device uses visual and audible means to alert the driver of the vehicle position, and alert users to the presence of fire, smoke, or carbon monoxide.

It is another object of the present invention to provide a portable parking assistance device for use in automotive service garages, car dealerships, or wherever precise vehicle placement is desired.

It is yet another object of the present invention to provide users with a simple carbon monoxide and smoke detection system for garages.

This invention is a safety parking assistance device that is usable in a confined parking location where a buildup of toxic fumes from an associated vehicle, including smoke and carbon monoxide, may be harmful to the vehicle operator or bystanders. The device includes a stand that receives contact sensing means that is connected to an alerting means also coupled to the stand. The device also includes a toxic fumes sensing means for detecting toxic fumes in the environment surrounding the device. When either the contact sensing means is activated by contact from an associated vehicle or the toxic fumes sensing means as activated by the presence of toxic fumes, the device alerts the associated vehicle operator or bystanders of the activation. The device may be portable and adjustable so as to be usable with a variety of different associated vehicles.

Still other objects and advantages of the invention will become apparent to those skilled in the art upon a reading and understanding of the following drawings and detailed specification.

III. BRIEF DESCRIPTION OF THE DRAWINGS

Figure 1A:
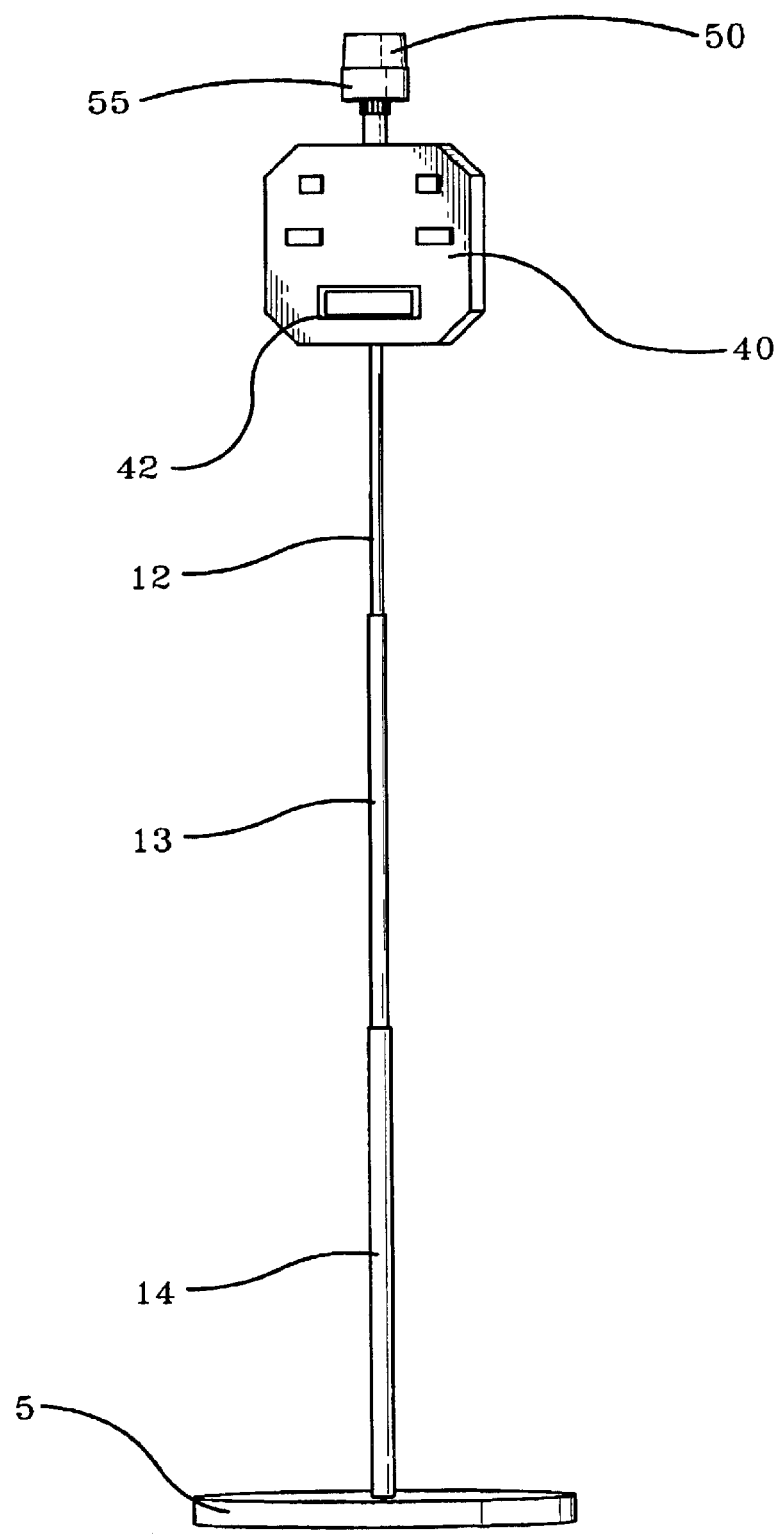

The invention may take physical form in certain parts and arrangement of parts, at least one embodiment of which will be described in detail in this specification and illustrated in the accompanying drawings which form a part hereof and wherein:

FIG. 1 is a drawing of a front view of one embodiment of the present invention; and, FIG. 1a is a drawing of a front view of an alternate embodiment of the present invention.

IV. DESCRIPTION OF THE INVENTION

Referring now to the drawings wherein the showings are for purposes of illustrating at least one embodiment of the invention only and not for purposes of limiting the same, FIG. 1 shows a safety device, generally shown at 1, having a stand 2. The stand 2 may include a base 5 and a shaft 10. The base 5 may be annular and may have a diameter of two (2) feet. The base may be constructed out of plastic; however, the base may alternatively be constructed out of aluminum, steel, rubber, or any other material selected with sound engineering judgment. The base 5 may support a substantially vertical, elongate shaft 10, discussed supra, and maintain the shaft 10 in a substantially vertical, operating position when an associated vehicle, generally depicted as 3, bumps the shaft 10 during use of the device 1. In accordance with its function, the base 5 may have any diameter or dimensions selected within sound engineering judgment.

With continued reference to FIG. 1, the stand 2 may also have a substantially vertical, elongated shaft 10 having first 15 and second 20 ends. The shaft 10 may be fixedly coupled, at its second end 20, to the base 5 at the center point of the base 5; however, the shaft 10 may be coupled to the base 5 at any location along the base 5 chosen with sound engineering judgment. The shaft 10 may be fixedly coupled to the base 5 by welding, adhesives, by the process of manufacture wherein the base 5 and the shaft 10 are molded as a single part, or by any other means selected with sound engineering judgment. It is also contemplated that the shaft 10 may be removably coupled to the base 5.

With continued reference to FIG. 1, the shaft 10 may be constructed of a rigid plastic, which may be PVC plastic. The material, and dimensions thereof, used to construct the shaft should be flexible and strong enough to withstand repeated contact with vehicles without cracking, but rigid enough to permit the shaft 10 to return to or remain in a substantially vertical, operating position. In this manner, the shaft 10 may be pliable and may also be spring-loaded. It is also contemplated in an alternate embodiment that the shaft 10 could be made of aluminum, graphite, or any material that is chosen with sound engineering judgment. It is additionally contemplated that the shaft 10 may be comprised of two or more members acting in conjunction.

With continued reference to FIGS. 1 and 1a, in this embodiment the shaft 10 may have a fixed length, which may be four (4) feet. This is sufficiently long, such that when the shaft 10 is positioned substantially vertically from the base 5, an associated operator sitting in the vehicle 3 may clearly view the first end 15 of the shaft 10. Alternately, the operative length of the shaft 10 may depend on the vehicle 3 that is associated with the device 1. In this manner, the length of the shaft 10 may vary from two (2) to ten (10) feet. Accordingly, the length of the shaft 10 may be any length selected with sound engineering judgment. In one embodiment of operation, the associated vehicle 3 may be brought into direct contact with the shaft 10 at a contact point 35, defined as the location of contact between the associated vehicle 3 and the shaft 10. This contact may activate an alerting means 50 attached to the shaft 10, as will be discussed in detail in a subsequent paragraph. Additionally, it is contemplated that the shaft 10 could be constructed so as to be selectively, longitudinally extendable. In this extendable embodiment, the shaft 10 may be comprised of two or more hollow shaft elements 12, 13, 14 with successively increasing diameters configured such that the preceding smaller shaft element(s) 12, 13 can fit within the immediately succeeding larger shaft element, 13, 14 when the shaft 10 is fully receded. In operation, the device 1 may be selectively, longitudinally extended by reversing this process. It is contemplated, however, that the length of the shaft 10 can be made selectively, longitudinally, extendable by any other means selected with sound engineering judgment.

With continued reference to FIG. 1, it is contemplated that the device 1 may be portable. Accordingly, the total weight of the device 1 may be limited to permit one of ordinary strength to selectively move the device 1 by dragging, rolling, or lifting and carrying. The device 1 may weigh five (5) pounds. The device 1 may weigh up to one hundred (100) pounds or have any weight that is within sound engineering judgment.

With continued reference to FIG. 1, the device 1 may include one or more toxic fume sensing means 40, coupled to the shaft 10 at a location at least six (6) inches from the contact point 35, preferably between the contact point 35 and the first end 15. It is noted that the toxic fume sensing means 40 may be located at any point along the shaft 10 or within the base 5 as chosen with sound engineering judgment. The toxic fume sensing means 40 may be powered by an on-board power source 42, such as, for example, a battery, so that the device 10 remains portable. It is contemplated that the device 1 may be used in assisting a vehicle operator with parking a vehicle 3, having an internal combustion engine that produces toxic fumes, including carbon monoxide, in an enclosed location such as a garage, parking structure, or vehicle dealership. In such enclosed areas, a build-up of toxic fumes may be harmful or fatal to the vehicle operator or bystanders. By toxic, it is meant that the fumes pose a greater than negligible risk to the health of a living being. Accordingly, the toxic fume sensing means 40 may be a Carbon Monoxide sensing means or a smoke sensing means. However, it is contemplated that sensing means for other types of toxic fumes emanating from associated vehicles may be used. In this embodiment, the toxic fume sensing means 40 is a combination Carbon Monoxide detector and smoke detector, which is well known in the art.

With continued reference to FIG. 1, the device 1 also includes contact sensing means 55 coupled to the shaft 10. The contact sensing means 55 senses when contact occurs between the device 1 and the associated vehicle 3 during parking. The contact sensing means 55 may be a motion sensing means, such as a motion detector. Alternatively, the contact sensing means 55 may also be a pressure sensing means. Other contact sensing means 55 may be used as selected within sound engineering judgment. In this embodiment, the contact sensing means 55 is a mercury switch that is removably coupled to the first end 15 of the shaft 10. The motion sensing means 55 detects the movement of the shaft 10 created by the associated vehicle 3 when the associated vehicle 3 bumps the device 1. In an alternate embodiment, pressure sensing means 55 is coupled to the shaft 10 at the contact point 35. In this alternate embodiment, the pressure sensing means 55 detects the pressure that results from the contact of the associated vehicle 3 with the pressure sensing means 55 at the contact point 35.

The device 1 also includes alerting means 50 coupled to the shaft 10 at the first end 15. The alerting means 50 is operatively communicated to the contact sensing means 55 so that when the contact sensing means 55 is actuated, the alerting means 50 is also actuated, thereby notifying the vehicle operator that the contact sensing means 55 has been actuated and contact has been made between the vehicle 3 and the device 1. This operative communication between the alerting means 50 and the contact sensing means 55 may be by effected by a direct physical circuit. However, it is also contemplated that the operative communication between the alerting means 50 and the contact sensing means 55 may be through a wireless configuration, such as infrared or radio frequency. However, the alerting means 50 and the contact sensing means may be operatively communicated by any means that is within sound engineering judgment. The alerting means 50 may be a visual means, such as a light or an audible means, such as a horn, siren, or alarm. In this embodiment, the alerting means 50 is both a light and a horn. It is further contemplated that the toxic fumes sensing means 40 may also be operatively communicated to the alerting means 50 so that when the toxic fume sensing means 40 is actuated, the alerting means 50 is also actuated, thereby notifying the vehicle operator that the toxic fume sensing means 40 has detected the presence of toxic fumes in the environment. Under this embodiment, the sensing means 40 may have a plurality of audible or visual means. In this embodiment, there is a single alerting means 50 removably coupled to the first end 15 of the shaft 10 and operatively communicates, via a direct circuit, to the contact sensing means 55.

It is contemplated that one or more additional alerting means 50 could be located apart from the device 1, such as in the associated vehicle 3 or on the wall of the associated enclosed garage, and operatively communicated by wireless means to the contact sensing means 55 or toxic fume sensing means 40 of the device 1. It is also contemplated that the alerting means 50 may be combined with the toxic fumes sensing means 40 in a single unit coupled to the shaft 10.

With continued reference to FIG. 1, in this embodiment, the toxic fumes sensing means 40 may be powered, as set forth above, by an on board power supply 42, such as a battery. The contact sensing means 55 and the alerting means 50 may be powered by one or more on board power supplies 44, such as batteries, that may be independent from the power supply 42 that is connected to the toxic fumes sensing means 40. Current regulations require that the toxic fume sensing means 40 be powered by a separate power supply from other components of the device 1. In an alternate embodiment, however, it is contemplated that the toxic fumes sensing means 40, the contact sensing means 55, and the alerting means 50 may all be connected to and powered by the same on board power supply 42.

At least one embodiment has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

I claim:

1. A safety, parking-assistance device for use with an associated vehicle, the associated vehicle capable of producing toxic fumes, the associated vehicle being operated in an associated confined space, the safety device comprising:
    a portable stand;
    a toxic fume sensing means for use in sensing toxic fumes, the toxic fumes sensing means being operatively received by the portable stand;
    a first on-board power source operatively communicated to the toxic fume sensing means;
    a contact sensing means for use in sensing contact of the device by the associated vehicle;
    at least a second on-board power source operatively communicated to the contact sensing means; and
    an alerting means for use in alerting an associated operator when contact of the device by the associated vehicle is sensed by the contact sensing means, the alerting means being operable to alert an associated operator when a sufficient level of toxic fumes is present in the associated confined space, wherein said safety device is adapted to be used in the confined space.

2. The safety device of claim 1, wherein the portable stand is selectively longitudinally adjustable.

3. The safety device of claim 2, wherein the toxic fume sensing means is a carbon monoxide sensing means.

4. The safety device of claim 2, wherein the toxic fume sensing means is a smoke sensing means.

5. The safety device of claim 3, wherein the contact sensing means is a mercury switch.

6. The safety device of claim 3, wherein the alerting means produces an audible signal;
    wherein the carbon monoxide sensing means is operatively communicated to engage the alerting means; and,
    wherein the contact sensing means is operatively communicated to engage the alerting means.

7. The safety device of claim 3, wherein the alerting means produces a visual signal,
    wherein the carbon monoxide sensing means is operatively communicated to engage the alerting means; and,
    wherein the contact sensing means is operatively communicated to engage the alerting means.

8. The safety device of claim 6 wherein the height of the portable stand is in the range of substantially 2 feet to substantially 10 feet.

9. The device of claim 6 wherein the weight of the portable stand is in the range of substantially 5 pounds to substantially 100 pounds.

10. A safety, parking-assistance device comprising:
    a portable stand;
    a toxic fumes sensing means for use in sensing toxic fumes, the toxic fumes sensing means being operatively received by the portable stand;
    a first on-board power source operatively communicated to the toxic fume sensing means;
    a contact sensing means for use in sensing contact of the device by an associated vehicle;
    an alerting means for use in alerting an associated operator when contact of the device by the associated vehicle is sensed by the contact sensing means, the alerting means being operable to alert the associated operator when a sufficient level of toxic fumes is present; and,
    a second on-board power source operatively communicated to both the contact sensing means and the alerting means, wherein the device is adapted to be positioned in a confined space.

11. The safety, parking-assistance device of claim 10, wherein the confined space is a garage.

12. A method for utilizing safety, parking-assistance device, comprising the steps of:
    providing a portable stand; a toxic fumes sensing means operatively received by the portable stand; a first on-board power source operatively communicated to the toxic fume sensing means; a contact sensing means for use in sensing contact of the device by an associated vehicle; an alerting means; and a second on-board power source operatively communicated to both the contact sensing means and the alerting means, wherein the device is adapted to be positioned in a confined space without sufficient ventilation;
    positioning the portable stand in a confined space;
    contacting the contact sensing means with an associated vehicle; and
    alerting an associated driver of the vehicle of the contact via the alerting means.

13. The method of claim 12, wherein the confined space is a garage.

14. The method of claim 12, further comprising the steps of:
    detecting toxic fumes;
    alerting the driver of the toxic fumes via the alerting means.

15. The method of claim 14, further comprising the steps of:
    detecting smoke;
    alerting the drive of the smoke via the alerting means.

* * * * *